United States Patent [19]

Bruza et al.

[11] Patent Number: 4,825,001
[45] Date of Patent: Apr. 25, 1989

[54] CYCLOBUTARENE KETOANILINE MONOMERIC AND POLYMERIC COMPOSITIONS

[75] Inventors: Kenneth J. Bruza; Robert A. Kirchhoff, both of Midland, Mich.

[73] Assignee: The Dow Chemical Company, Midland, Mich.

[21] Appl. No.: 236,821

[22] Filed: Aug. 26, 1988

Related U.S. Application Data

[62] Division of Ser. No. 109,136, Oct. 16, 1987, Pat. No. 4,795,827.

[51] Int. Cl.$^4$ ...................... C07C 97/10; C09B 11/02
[52] U.S. Cl. .................... 564/328; 564/329; 558/426; 562/460
[58] Field of Search .................... 564/328; 558/426; 562/460

[56] References Cited

U.S. PATENT DOCUMENTS 4,540,763 9/1985 Kirchhoff .
4,724,260 2/1988 Kirchhoff et al. .

OTHER PUBLICATIONS

Pearson et al., *Synthesis*, pp. 533–542 (1972), "Friedel–Crafts Acylations with Little or No Catalyst".
Morley, *J. Chem. Soc. Perkin II*, pp. 601–605, "Aromatic Acylations Catalysed by Metal Oxides" (1977).
Morley, *Synthesis*, pp. 54–55 (1977), "Benzoylation of Halobenzenes Catalysed by Iron (III) Sulphate".
Lloyd et al., *Tetrahedron*, vol. 21, pp. 245–254, (1965), "The Electrophilic Substitution of Benzocyclobutene-II".
Jensen et al., *J. Org. Chem.*, vol. 25, pp. 640–641 (1960), "Unsaturated Four-Membered Ring Compounds, III. The Reactivity of Benzycyclobutene Toward Electrophilic Substitution".
Chiusoli et al., *Transition Met. Chem.* 2, 270–272 (1977), "Synthesis of Ketone from Aroyl Chlorides and Nickel (O) Complexes".
Tsukervanik et al., Uzbek. Khim. Zhur No. 2, pp. 60–62 (1961) abstract from Chem. Abstracts; vol. 55, (1961) col. 27206, "Acylation of Arommatic Compounds in the Presence of Metals".
Tsukervanik, Daklady Akad. Nauk Uzbek. SSR No. 4, 36–39 (1959) abstract from Chem. Abstracts, vol. 54 (1960) col. 10816–10817, "Iron Powder as an Alkylation and Acylation Catalyst".

*Primary Examiner*—Earl Nielsen
*Assistant Examiner*—Frederick F. Krass

[57] ABSTRACT

The invention comprises cyclobutarene ketoaniline monomers and the process for preparing them. The monomers can be used to graft and/or endcap a monomer or polymer having at least 1 amino-reactive functionality. The grafted and/or endcapped monomer or polymer can subsequently be processed to prepare a highly crosslinked network. Said monomers have the formula:

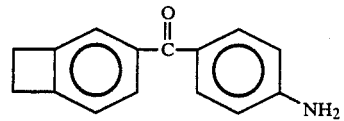

as a preferred embodiment.

6 Claims, No Drawings

CYCLOBUTARENE KETOANILINE MONOMERIC AND POLYMERIC COMPOSITIONS

CROSS-REFERENCE TO RELATED APPLICATION

This is a divisional, of application Ser. No. 109,136 now U.S. Pat. No. 4,795,827, filed Oct. 16, 1987.

BACKGROUND OF THE INVENTION

This invention relates to improved monomeric and polymeric compositions derived from cyclobutarenes and the processes for preparing them.

Polymeric compositions derived from biscyclobutarene monomers are disclosed in U.S. Pat. No. 4,540,763. They are prepared by subjecting biscyclobutarene monomers to temperatures sufficient to polymerize the monomers. These compositions exhibit excellent thermal stability at high temperatures, good chemical resistance to most industrial solvents, and low sensitivity to water. These properties are highly desirable for applications in the electronics and aerospace industries, as well as for any other application where thermoset resins exhibiting outstanding physical and mechanical properties are required.

Thermoset resins are monomeric and polymeric compositions which can solidify irreversibly upon heating. They are useful in many engineering applications. For example, they are useful as coatings, structural laminates, adhesives, films, and composities. Typical thermoset resins exhibiting properties which encourage their use as engineering materials include polyesters, polyamides, polyimides, and epoxy resins.

Unfortunately, conventional thermoset resins do not exhibit the thermal stability, chemical resistance and low sensitivity to water of the polymeric compositions of U.S. Pat. Nos. 4,540,763 prepared from biscyclobutarene monomers. Therefore, it would be desirable to provide improved thermoset resins derived from cyclobutarenes that exhibit the properties required for demanding applications in the electronics and aerospace industries, as well as other industries where high performance is required.

SUMMARY OF THE INVENTION

In one aspect, the invention represents a cyclobutarene ketoaniline monomer and the process for preparing it. The monomer is represented by the formula:

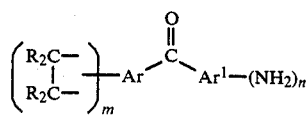

wherein
Ar is an aromatic moiety having one valence on each of two adjacent carbon atoms of an aromatic ring;
$Ar^1$ is substituted or unsubstituted arylene;
each R is independently hydrogen, a monovalent electron donating moiety or a monovalent electron withdrawing moiety; and
each m and n is independently an integer of 1 or 2.

The process for preparing the monomer comprises the steps of reacting a cyclobutarene with a nitro-substituted aromatic acid halide in the presence of a reaction catalyst capable of either accepting a pair of electrons or donating a proton during the reaction and then contacting the resulting cyclobutarene intermediate with a reducing agent at conditions sufficient to selectively reduce the nitro groups to amino groups.

In another aspect, the invention is a process for grafting and/or endcapping a monomer or polymer with a cyclobutarene moiety comprising the step of reacting either a monomer having at least 1 amino-reactive functionality or a polymer having at least one amino-reactive functionality with the monomer of this invention.

In yet another aspect, the invention is a process for preparing a crosslinked network from the grafted and/or endcapped monomers and polymers prepared from the process of this invention, comprising the step of subjecting the grafted and/or endcapped monomer or polymer to ring scission polymerization conditions.

In a final aspect, the invention is a process for preparing a homopolymer from the monomer of this invention, comprising the step of subjecting the monomer to ring scission polymerization conditions.

The monomer and polymer compositions of this invention provide a family of improved thermoset resins. These resins can be processed to prepare engineering materials for the electronics and aerospace industries. They possess outstanding mechanical, physical, and electrical properties, as well as good chemical resistance and thermal stability at temperatures exceeding 250° C. They can also be blended or alloyed with conventional thermoset resins to prepare resins with improved properties for any industry where high performance is required.

DETAILED DESCRIPTION OF THE INVENTION

The monomer of this invention has the following formula:

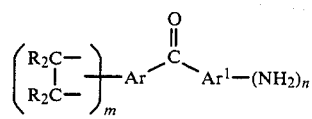

wherein
Ar is an aromatic moiety having one valence on each of two adjacent carbon atoms of an aromatic ring;
$Ar^1$ is substituted or unsubstituted arylene;
each R is independently hydrogen, a monovalent electron donating moiety or a monovalent electron withdrawing moiety; and
each m and n is independently an integer of 1 or 2.

An aromatic moiety is a group derived from an aromatic compound containing $(4N+2)\pi$ electrons as described in Morrison & Boyd, *Organic Chemistry*, 3rd ed., 1973. Suitable aromatic moieties are derived from benzene, naphthalene, phenanthrene, anthracene, biphenyl and two or more aromatic moieties bridged by alkylene, cycloalkylene, oxygen, nitrogen, sulfoxide, sulfone, or carbonyl moieties. Also included are moieties derived from substituted aromatic compounds, such as, for example, lower alkyl, halo, nitro, alkoxy and aryloxy-substituted aromatic compounds; and moieties derived from heterocyclic compounds, such as pyridine and picoline. The preferred aromatic moieties are derived from benzene and naphthalene.

The aromatic moiety has one valence on each of two adjacent carbon atoms of an aromatic ring so that a substituted or unsubstituted cyclobutane ring can fuse to the aromatic ring. When the subscript m of the formula disclosed hereinbefore is 2, then the aromatic moiety has one valence on each carbon atom in two separate pairs of adjacent carbon atoms of one or more aromatic rings. In this instance, a substituted or unsubstituted cyclobutane ring fuses to each of the two separate pairs of adjacent carbon atoms.

As the term is used herein, an arylene is a divalent aromatic moiety.

Monovalent electron-donating moieties are either monovalent atoms or monovalent radicals which donate electrons more than a hydrogen atom would if accompanying the same site. Monovalent electron-withdrawing moieties are atoms or radicals which more readily withdraw an electron relative to a hydrogen atom. Examples of suitable electron-withdrawing moieties include nitro, cyano, bromo, iodo, chloro, fluoro and carboxy. Examples of suitable electron-donating moieties include lower alkyl, aryl, hydroxy, alkoxy, aryloxy and amino.

The monomer represented by the formula above will be referred to as a cyclobutarene ketoaniline monomer. A preferred cyclobutarene ketoaniline monomer is depicted by the formula above when the subscript n is 1. The most preferred cyclobutarene ketoaniline monomer has the following formula:

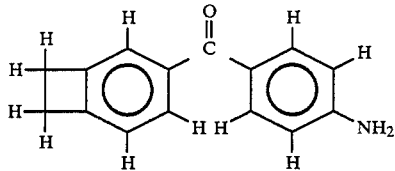

The process for preparing the cyclobutarene ketoaniline monomer of this invention requires the reaction of a cyclobutarene with a nitro-substituted aromatic acid halide in the presence of a suitable reaction catalyst. A "cyclobutarene" refers to a compound containing at least one aromatic ring to which is fused one or more cyclobutane rings. The nitro-substituted aromatic acid halide has the following formula:

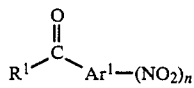

wherein
$Ar^1$ is substituted or unsubstituted arylene;
$R^1$ is chloro, bromo, or iodo; and
n is an integer of 1 or 2.

A more preferred nitro-substituted aromatic acid halide has the following formula:

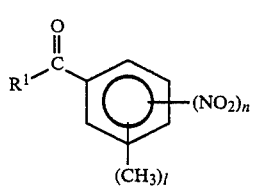

wherein $R^1$ is chloro, bromo or iodo; n is an integer of 1 or 2; and l is an integer of zero or 1.

The most preferred cyclobutarene is benzocyclobutene. The most preferred acid halide is 4-nitrobenzoyl chloride. The initial reaction of benzocyclobutene with 4-nitrobenzoyl chloride and the subsequent reduction of the nitro group on the resulting intermediate to an amino group will produce the most preferred cyclobutarene ketoaniline monomer.

Suitable reaction catalysts for preparing the cyclobutarene intermediate include compounds which function as Lewis acids; such as tin (IV) chloride, tin (II) chloride, antimony (III) chloride, antimony (V) chloride, any aluminum salt or oxide, any iron salt or oxide, iron metal, any zinc salt or oxide, and zinc metal; strong protic acids such as sulfuric acid, polyphosphoric acid, trifluoroacetic acid and methanesulfonic acid; certain organometallic compounds such as organic complexes of iron; and trifluoroacetic anhydride. Compounds which function as Lewis acids are those compounds having the ability to accept a pair of electrons from another compound. A protic acid is a compound that will donate a proton during a chemical reaction. The preferred reaction catalysts are iron (III) oxide and zinc oxide. The most preferred reaction catalyst is iron (III) oxide.

As disclosed in U.S. Pat. No. 4,570,011, cyclobutarenes can be prepared by dissolving an ortho alkyl halomethyl aromatic hydrocarbon, such as ortho methyl-chloromethylbenzene, in an inert solvent, and then pyrolyzing the solution under suitable reaction conditions. Nitro-substituted aromatic acid halides useful in this invention can be prepared by reacting about 1 equivalent of the corresponding nitro-substituted aromatic carboxylic acid with about 2 equivalents of a thionyl halide or a phosphorous trihalide. The reaction mixture is heated to reflux and maintained at reflux for about 1 hour. After the reaction, the mixture is cooled to room temperature. The excess thionyl halide or phosphorous trihalide can then be physically separated from the acid halide.

The molar ratio of the cyclobutarene to the acid halide required for preparing the cyclobutarene intermediate can range from about 1.5:1 to about 10:1. The preferred molar ratio can range from about 2:1 to about 3:1. The most preferred molar ratio is about 2:1. The required molar ratio of the acid halide to the reaction catalyst can range from about 5:1 to about 1000:1. The preferred ratio can range from about 100:1 to about 500:1.

The temperature required for preparing the intermediate can range from about 100° C. to about 180° C., with a preferred range from about 135° C. to about 150° C. Generally, as the reaction temperature increases, the time required for the reaction decreases. The time required to reach a yield of the cyclobutarene intermediate of between 30 weight percent and 50 weight percent can range from about 5 hours to about 24 hours. Yield is defined as the weight percent of reactants that form the cyclobutarene intermediate. Preferably, the reactants are stirred vigorously during the reaction.

After the reaction, the resulting cyclobutarene intemediate can be separated from the reaction mixture. One method of separation involves cooling the mixture to room temperature and adding an aliphatic hydrocarbon solvent, such as heptane or hexane, to the reaction mixture in an amount sufficient to at least double its volume. The diluted mixture is heated to reflux and the solvent layer is subsequently decanted. The solvent extracts the cyclobutarene intermediate. Upon cooling of the solvent, the cyclobutarene intermediate crystallizes.

The cyclobutarene ketoaniline monomer can now be prepared by contacting the cyclobutarene intermediate with a reducing agent at conditions sufficient to selectively reduce the nitro groups to amino groups. A suitable process for selectively reducing the nitro groups of the cyclobutarene intermediate to amino groups is disclosed in Satoh et al., Chem. Pharm. Bull., 29 (5) pp. 1443-45 (1981). A solution of sodium borohydride in ethanol can be added to a heated mixture of the cyclobutarene intermediate in the presence of a catalytic amount of tin (II) chloride dihydrate. After the addition of the sodium borohydride solution, concentrated sodium hydroxide and water are added to react with excess sodium borohydride and tin (II) chloride dihydrate. The cyclobutarene ketoaniline can then be separated by extraction with diethyl ether.

Alternatively, the nitro groups of the cyclobutarene intermediate can be selectively reduced to amino groups by hydrogenation over a noble metal catalyst, such as palladium metal or palladium oxide, at slightly elevated pressures.

The most preferred cyclobutarene ketonailine monomer can react with maleic anhydride to form a maleamic acid derivative of the formula:

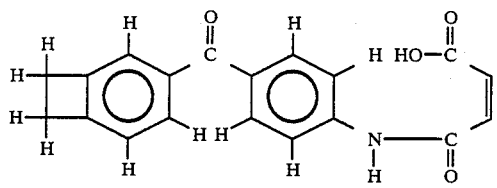

The dehydration of the maleamic acid derivative will yield a cyclobutarene maleimide of the formula:

A suitable dehydrating agent is acetic anhydride. The dehydration can be catalyzed by a compatible metal complex, such as nickel (II) acetate tetrahydrate, in the presence of a tertiary amine which acts as an acid scavenger.

In a preferred embodiment of this invention, monomers and polymers having at least 1 amino-reactive functionality are grafted and/or endcapped with the cyclobutarene ketoaniline monomer. Examples of amino-reactive functionalities include but are not limited to epoxides, acid halides, esters, anhydrides and carbonyl-containing moieties. The term "grafted" refers to the placement of the cyclobutarene monomer on the backbone of a monomer of polymer chain. The term "endcapped" refers to the placement of the cyclobutarene monomer on a monomer or polymer chain in such a way that the monomer or polymer chain terminates with the cyclobutarene moieties.

Preferred monomers are difunctional monomers having two amino-reactive functionalities. Difunctional monomers with two amino-reactive functionalities are particularly suitable for the encapping reaction. Examples include terephthaloyl chloride, tolylene 2,4-diisocyanate, adipoyl chloride, and 4,4'-biphenyldicarboxylic acid chloride.

The term "polymers" includes dimers, oligomers, and prepolymers. The polymer may have two or more amino-reactive functionalities. Advantageously, the polymer has at least 1 amino-reactive functionality per weight average molecular weight as measured by gel permeation chromatography. Preferably, the polymer is linear and each end of the polymer terminates with a amino-reactive functionality.

As an example of the endcapping reaction of a difunctional monomer, the reaction of terephthaloyl chloride with the most preferred cyclobutarene ketoaniline monomer will yield an endcapped monomer of the formula:

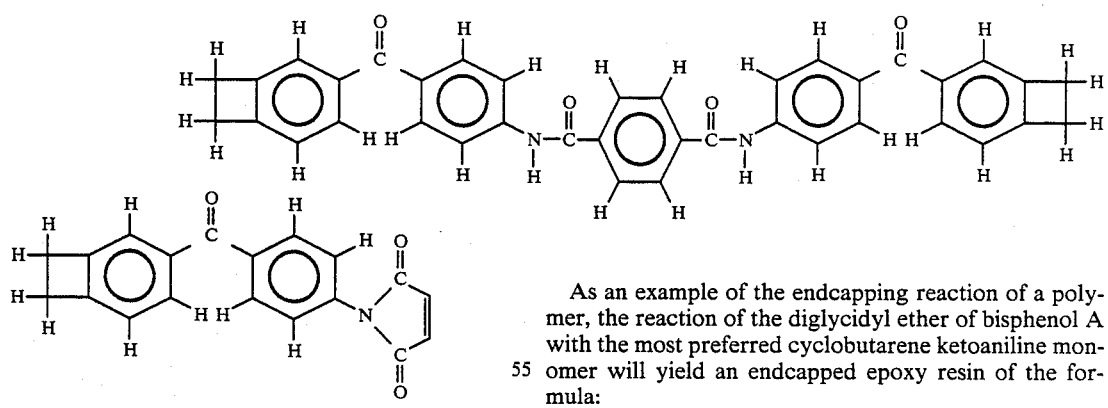

As an example of the endcapping reaction of a polymer, the reaction of the diglycidyl ether of bisphenol A with the most preferred cyclobutarene ketoaniline monomer will yield an endcapped epoxy resin of the formula:

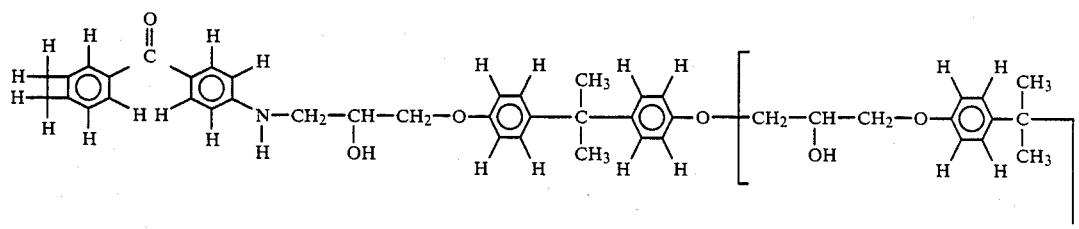

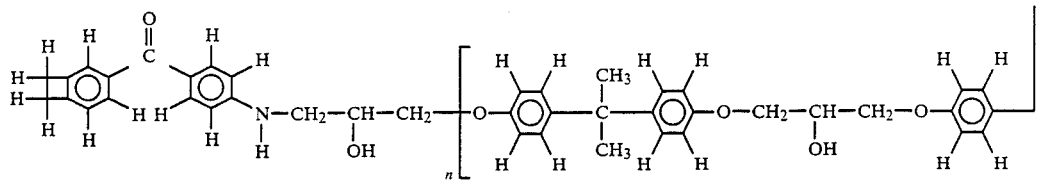

wherein n is an integer of at least 1.

An endcapped polyester can also be prepared in a like manner. For example, the endcapping of a polyester, prepared from the copolymerization of phthaloyl chloride and 1,4-butanediol, with the most preferred cyclobutarene ketoaniline will yield an endcapped polyester of the formula:

lene diamine, with the most preferred cyclobutarene ketoaniline will yield an endcapped polyamide of the formula:

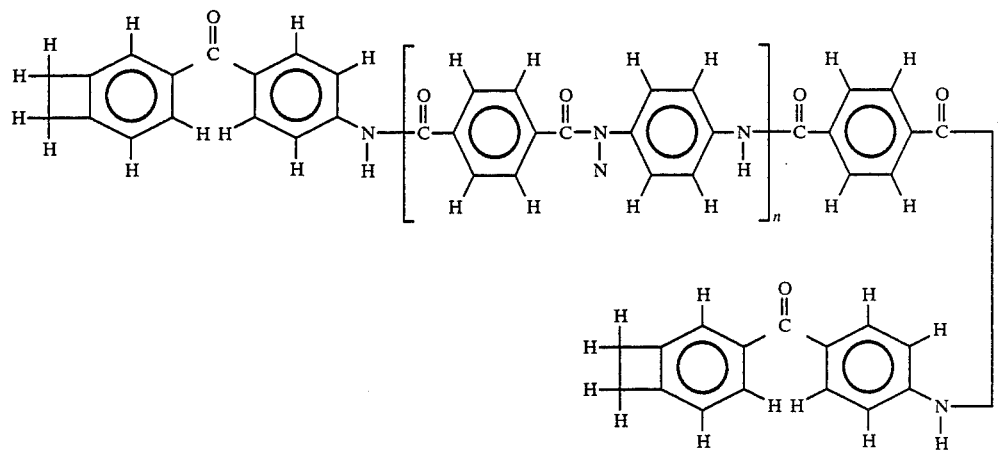

wherein n is an integer of at least 1.

The endcapping of a polyimide, prepared from the copolymerization of pyromellitic dianhydride and methylene dianiline, with the most preferred cyclobuta-

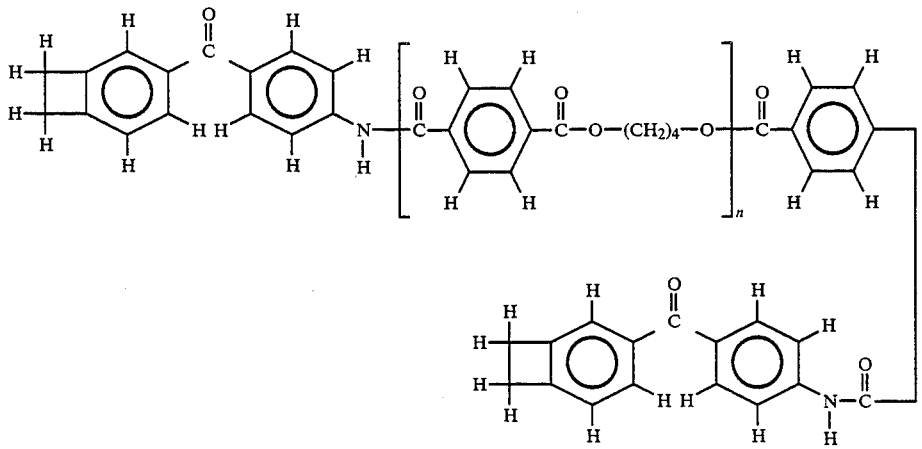

wherein n is an integer of at least 1.

The endcapping of a polyamide, prepared from the copolymerization of phthaloyl chloride and paraphenyrene ketoaniline will yield an endcapped polyamide of the formula:

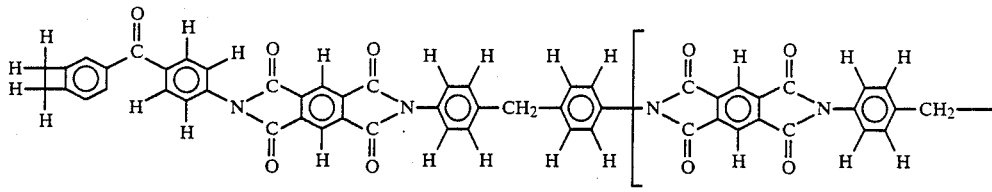

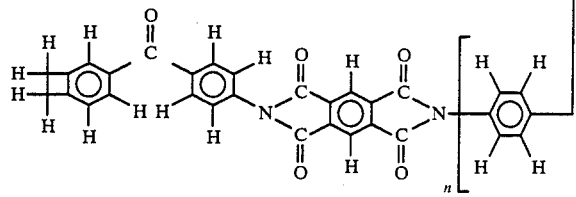

wherein n is an integer of at least 1.

As an example of the grafting reaction, the reaction of styrene maleic anhydride (SMA) with the most preferred cyclobutarene ketoaniline monomer will yield a grafted SMA polymer of the formula:

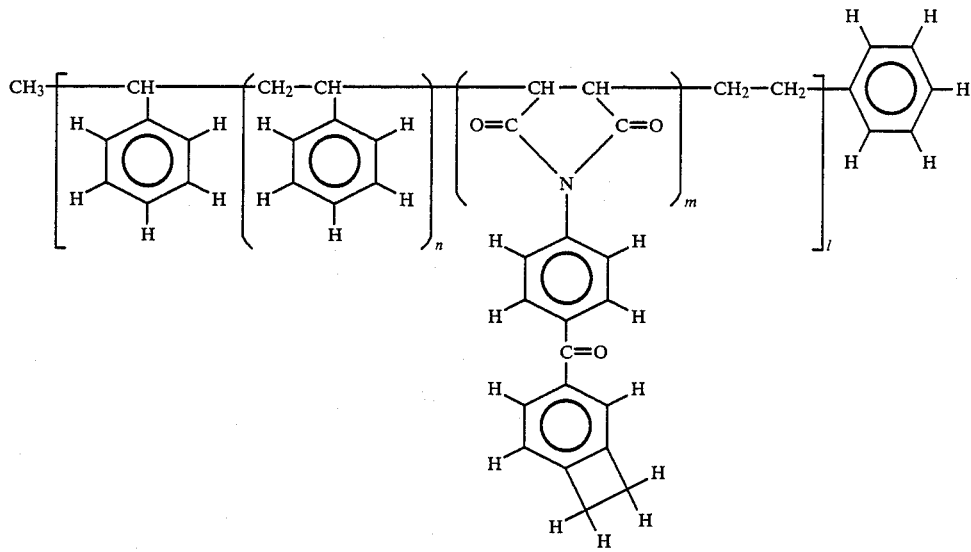

wherein
l is an integer between 1 and 100, inclusive;
m is a number between 0.5 and 0.99, inclusive; and
n is a number between 0.01 and 0.5, inclusive.

The process conditions necessary to graft and/or encap the amino-reactive monomer or polymer with the cyclobutarene ketoaniline monomer of this invention can be readily determined empirically. The proportions of amino-reactive monomer or polymer and cyclobutarene ketoaniline monomer necessary for the reaction are a function of the molecular weight of the monomer or polymer, the number of amino-reactive functionalities present, and the number of amino-reactive functionalities desired to be reacted (it may be desirable to react only a small percentage of the total number of amino-reactive functionalities). The reaction temperature is also a function of the monomer or polymer characteristics and can range from room temperature to reflux. The completion of the grafting and/or endcapping reaction is readily observed visually or with the aid of standard testing equipment.

The grafted and/or endcapped monomers or polymers of this invention can be subjected to ring scission polymerization conditions to prepare highly cross-linked, three-dimensional polymeric networks. In this context, "ring scission polymerization" refers to the reaction of an opened cyclobutane ring on a cyclobutarene moiety with either another opened cyclobutane ring or a moiety capable of reacting with an opened cyclobutane ring.

When the cyclobutane ring of the cyclobutarene moiety opens, it forms a conjugated diene (or-thoquinodimethane) that can react with a dienophilic moiety (a "diene loving" moiety). Unlike condensation polymerization, a small molecule is not split out during the reaction. Typically, the opened ring reacts with another opened ring. U.S. Pat. No. 4,540,763 discloses some of the potential reactions that can occur when opened rings react with each other. An opened ring can potentially react with an olefinic or acetylenic moiety via a Diels-Alder reaction as disclosed in Feiser and Feiser, *Organic Chemistry*, 3rd ed., 1980.

The cyclobutane ring of the cyclobutarene moiety can open by subjecting the grafted and encapped polymers of this invention to sufficient heat. Typically, temperatures from about 200° C. to 300° C. are sufficient to open the ring. Polymerization solvents or catalysts are unnecessary, although a copper salt catalyst may lower the required temperature. Gamma radiation and electron beam radiation can also open the ring, but thermal radiation is preferred since it can be applied by conventional methods.

In a similar manner, the cyclobutarene ketoaniline monomers can be subjected to ring scission polymerization conditions to prepare low molecular weight homopolymers.

The monomeric and polymeric compositions of this invention are useful as thermoset resins that exhibit a wide range of desirable properties for engineering applications. Their mechanical properties, thermal stability at extreme temperatures, and chemical resistance easily make them highly suitable for preparing advanced composites, laminates for circuit boards, passivation or planarization resins, and die attach materials. They can be used for any other application where high performance thermoset resins are required.

The following examples are illustrative only and are not intended to limit the scope of this invention.

EXAMPLE 1

Preparation of 4-Nitrophenyl-4-Benzocyclobutenyl Ketone

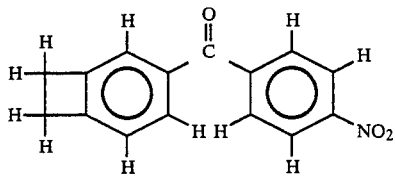

Forty grams (g) (0.3864 mole) of benzocyclobutene, 38.69 g (0.1923 mole) of 4-nitrobenzoyl chloride and 0.320 g (0.002 mole; one mole percent) of iron (III) oxide are charged to a 250 ml roundbottom flask equipped with a magnetic stirring bar and a reflux condenser with a nitrogen inlet. The mixture is vigorously stirred and is heated to 140° C. under a nitrogen atmosphere with the aid of an oil bath. The reaction mixture is maintained at this temperature for 16 hours and is subsequently cooled to room temperature. When the mixture is cooled it forms a dark brown viscous liquid. This viscous liquid is treated with 150 ml of n-hexane and is heated to the boiling temperature. The hexane is decanted from the viscous liquid and the hexane treatment is repeated several more times. The hexane layers are combined and the hexane is removed on a rotary evaporator. 50.7 Grams of a solid/liquid mixture is obtained. The mixture is washed with cold hexane and filtered by suction. The weight of the solids remaining is 20.15 g (41.4 percent). The analysis by means of NMR and IR is consistent with the proposed structure. The solid product is further treated with hexane and purified with decolorizing charcoal to yield 15 g of analytically pure material which has a melting point between 107° and 110° C. The calculated elemental analysis is 71.14 percent carbon, 4.38 percent hydrogen, and 5.53 percent nitrogen. The actual elemental analysis is 71.48 percent carbon, 4.54 percent hydrogen, and 5.54 percent nitrogen.

EXAMPLE 2

Preparation of 4-Aminophenyl-4-benzocyclobutenyl Ketone

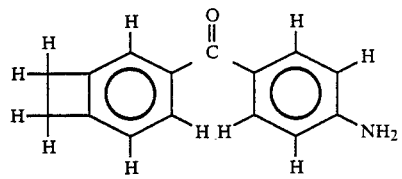

1.0 Gram (3.95 mmole) of 4-nitrophenyl-4-benzocyclobutenyl ketone, 4.46 g (19.75 mmole) of tin (II) chloride dihydrate and 100 ml of ethanol are charged to a 250 ml roundbottom, 3-necked flask equipped with a magnetic stirring bar, reflux condenser with nitrogen inlet tube, a thermometer and an equilibrating addition funnel. The reaction mixture is heated to 60° C. under a nitrogen atmosphere with the aid of an oil bath. 75 Milligrams (1.975 mmole) of sodium borohydride in 20 ml of ethanol is charged to the addition funnel. The sodium borohydride solution is added dropwise over a period of 15 minutes. After the addition, the temperature is maintained at 60° C. for 30 minutes. The reaction mixture is then cooled to 10° C. in an ice bath and 80 ml of chilled distilled water is added. The reaction mixture is neutralized to a pH of 7 by adding 6 ml of 4M sodium hydroxide. The neutralized mixture is then transferred to a 500 ml roundbottom flask. The ethanol is removed on a rotary evaporator and an off-white slurry forms. 100 Milliliters of water is added to the off-white slurry and the aqueous phase is extracted with diethyl ether (4×100 ml). The combined ethereal washes are dried over sodium sulfate before filtering. The resulting solution is concentrated on a rotary evaporator to remove the solvents and yields 0.87 g (98.8 percent) of a bright orange solid. This solid is dissolved in hot carbon tetrachloride, purified with decolorizing charcoal, and reprecipitated from the carbon tetrachloride solution upon cooling yielding 0.54 g (61.3 percent) of a pale yellow solid with a melting point between 151° and 152° C. The analysis by means of NMR and IR is consistent with the proposed structure. The calculated elemental analysis is 80.69 percent carbon, 5.87 percent hydrogen and 6.27 percent nitrogen. The actual elemental analysis yields 80.59 percent carbon, 6.00 percent hydrogen and 6.28 percent nitrogen.

EXAMPLE 3

Preparation of the Homopolymer of 4-Aminophenyl-4-Benzocyclobutenyl Ketone From Example 2

The monomer of Example 2 is heated from room temperature to approximately 360° C. in a differential scanning calorimeter and displays a melting endotherm at 152° C. and a polymerization exotherm at 261.8° C. The sample is cooled to room temperature and is once again heated to 360° C. The sample now no longer has a melting point and does not exotherm at 261.8° C. A glass transition temperature exhibited at 170° C. indicates the presence of a material with a higher molecular weight than the starting material.

EXAMPLE 4

Preparation of
4-N-maleimidophenyl-4-benzocyclobutenyl Ketone
Prepared From the
4-Aminophenyl-4-Benzocyclobutenyl Ketone of
Example 2

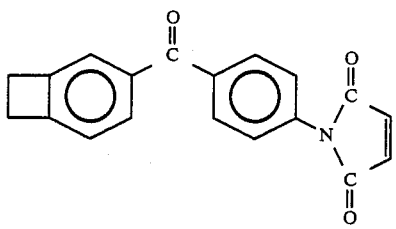

1.0 Gram (4.482 mmole) of 4-aminophenyl-4-benzocyclobutenyl ketone and 20 of acetone are charged to a 100 ml roundbottom, 1-necked flask equipped with a magnetic stirring bar and a nitrogen inlet. The mixture is vigorously stirred under a nitrogen atomsphere. 0.440 Gram (4.482 mmole) of maleic anhydride is added to the reaction mixture in several portions over a period of two minutes. After the addition of maleic anhydride, the reaction mixture is stirred at room temperature for 20 hours. At the end of 20 hours, a white solid was formed which is the maleamic acid derivative. 914 Milligrams (8.955 mmoles; 0.84 ml) of acetic anhydride, 35 mg (0.142 mmole) of nickel (II) acetate tetrahydrate and 19 drops (approximately 1 ml) of triethylamine are added to the maleamic acid derivative as it is being stirred. The reaction mixture becomes a homogeneous yellow solution. It is stirred at room temperature for 20 hours. After this time, the reaction mixture appears as an orange hazy color. The mixture is poured into 80 ml of vigorously stirred 10 percent sodium bicarbonate. An orange solid separates out from the mixture. This solid is treated with chloroform and transferred to a separatory funnel where the aqueous phase is separated from the organic phase. The aqueous phase is extracted with the addition of 100 ml of chloroform. The chloroform layers are combined and washed with 10 percent hydrochloric acid ($1\times50$ ml) water ($2\times50$ ml) and brine ($1\times50$ ml) before drying over magnesium sulfate. The resulting mixture is filtered by suction filtration through Celite diatomaceous earth and the solvent is removed in vacuo. 1.2 Grams (89 percent) of an orange viscous syrup is obtained. This viscous syrup is dissolved in hot ethanol, treated with decolorizing charcoal, filtered and reprecipitated from solution upon cooling to provide 0.88 g of a white solid with a melting point of 146.9° C. The analysis by means of NMR and IR fit perfectly for the proposed structure.

EXAMPLE 5

Preparation of the Polymer of
4-N-Maleimidophenyl-4Benzocyclobutenyl Ketone
from Example 4

146 Milligrams of the monomer of Example 4 is placed in a glass tube under a nitrogen atmosphere. A Woods metal bath is heated to 150° C. and the glass tube containing the monomer is placed in the bath. The monomer is subjected to the following temperatures for the following time periods:

| Temperature (°C.) | Time (Hour) |
| --- | --- |
| 150 | 0.5 |
| 180 | 0.5 |
| 210 | 0.5 |
| 235 | 1.0 |
| 260 | 1.0 |
| 270 | 1.0 |

After one hour at 270° C. the tube is removed from the bath and is cooled to room temperature under a nitrogen atmosphere. The pellet of polymer is removed from the bottom of the tube and is shown by thermogravimetric analysis to have a weight loss onset at 328° C. in a nitrogen atmosphere. A five percent weight loss occurs at 464° C. This data indicates excellent thermal stability at high temperatures. This polymer as well as other polymer compositions of this invention exhibit improved solvent resistance as well as good thermooxidative stability.

What is claimed is:

1. A monomer of the formula:

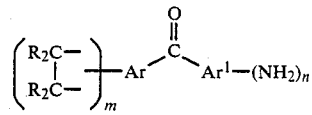

wherein
Ar is an aromatic moiety having one valence on each of two adjacent carbon atoms of an aromatic ring;
$Ar^1$ is substituted or unsubstituted arylene;
each R is independently hydrogen, a monovalent electron donating moiety or a monovalent electron withdrawing moiety; and
each m and n is independently an integer of 1 or 2.

2. The monomer of claim 1 wherein Ar or $Ar^1$ is a benzene moiety or a naphthalene moiety.

3. The monomer of claim 2 wherein the monovalent electron-donating moiety is lower alkyl, aryl, hydroxy, alkoxy, aryloxy or amino.

4. The monomer of claim 2 wherein the monovalent electron-withdrawing moiety is nitro, cyano, bromo, iodo, chloro, fluoro, or carboxy.

5. The monomer of claims 2, 3 or 4 wherein n is 1.

6. The monomer of claim 3 of the formula:

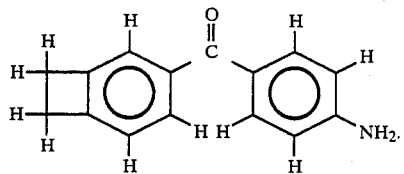

* * * * *